United States Patent [19]

Hamisch, Jr.

[11] Patent Number: 4,483,053

[45] Date of Patent: Nov. 20, 1984

[54] METHOD OF MAKING AN INK ROLLER

[75] Inventor: Paul H. Hamisch, Jr., Franklin, Ohio

[73] Assignee: Monarch Marking Systems, Inc., Dayton, Ohio

[21] Appl. No.: 479,767

[22] Filed: Mar. 28, 1983

Related U.S. Application Data

[60] Continuation of Ser. No. 282,123, Jul. 10, 1981, abandoned, which is a division of Ser. No. 161,813, Jun. 23, 1980, abandoned.

[51] Int. Cl.[3] .......................... B21H 1/14; B23P 19/00

[52] U.S. Cl. ................................ 29/148.4 D; 29/434; 29/450; 29/121.3; 29/527.1; 101/367; 249/122; 249/142; 264/318; 264/328.1; 264/DIG. 70; 425/DIG. 37

[58] Field of Search ............... 29/148.4 D, 121.3, 123, 29/434, 450, 125, 527.1; 101/340, 367, 375, 348; 249/122, 142, 144, 175; 264/DIG. 70, DIG. 48, DIG. 68, 299, 328.2, 328.1, 318; 401/197; 425/DIG. 37, 58, 119

[56] References Cited

U.S. PATENT DOCUMENTS

| | | | |
|---|---|---|---|
| 403,082 | 5/1889 | Adams et al. | 101/367 X |
| 440,824 | 11/1890 | Fuerth . | |
| 491,036 | 1/1893 | Fairfield . | |
| 714,835 | 12/1902 | Tevander . | |
| 895,904 | 8/1908 | Smyth et al. | 426/DIG. 37 UX |
| 949,437 | 2/1910 | Munk . | |
| 1,018,886 | 2/1912 | Dodge . | |
| 1,371,680 | 3/1921 | Hiltz | 249/122 |
| 1,612,936 | 1/1927 | Mitchell et al. . | |
| 2,637,272 | 5/1953 | Hesson . | |
| 2,712,159 | 7/1955 | Marsch . | |
| 2,743,469 | 5/1956 | Ditch | 401/197 X |
| 2,916,755 | 12/1959 | Bozzay | 101/367 X |
| 2,949,636 | 8/1960 | Mastin | 425/DIG. 58 UX |
| 2,965,911 | 12/1960 | Hempel et al. . | |
| 3,021,241 | 2/1962 | Schneiderman | 264/DIG. 70 UX |
| 3,044,397 | 7/1962 | Pine . | |
| 3,060,509 | 10/1962 | McCubbins, Jr. | 264/DIG. 70 UX |
| 3,188,692 | 6/1965 | Traeger | 249/142 |
| 3,355,772 | 12/1967 | Kolberg | 249/142 X |
| 3,436,161 | 4/1969 | Charos . | |
| 3,640,218 | 2/1972 | Allison | 101/375 |
| 3,756,553 | 9/1973 | Ranz . | |
| 3,878,783 | 4/1975 | Hamisch, Jr. | 101/340 |
| 3,948,172 | 4/1976 | Jenkins . | |
| 4,090,687 | 5/1978 | Langhammer et al. | 249/122 X |
| 4,207,818 | 6/1980 | Hamisch, Jr. | 101/348 |
| 4,243,199 | 1/1981 | Hill | 425/DIG. 58 |

FOREIGN PATENT DOCUMENTS

| | | | |
|---|---|---|---|
| 472608 | 2/1927 | Fed. Rep. of Germany | 101/367 |
| 602027 | 11/1926 | France | 101/367 |
| 1020829 | 11/1953 | France . | |
| 1347194 | 11/1963 | France | 29/123 |
| 393375 | 10/1965 | Switzerland . | |

*Primary Examiner*—Charlie T. Moon

*Attorney, Agent, or Firm*—Joseph J. Grass

[57] ABSTRACT

There is disclosed an ink roller and method of making same. The ink roller includes a tube having a plurality of holes. A porous ink-receptive sleeve is received about the tube. The end portions of the tube are coupled to bearing rolls and the bearing rolls are closed off to provide space for holding ink. At least one bearing roll is a separate part and is sealed to the tube and closures are sealed to both bearing rolls. Means are provided to keep the separate bearing roll from becoming uncoupled from the tube. The holes converge outwardly toward the surface of the roll to conduct ink to the sleeve. Also disclosed is method of making the roll.

4 Claims, 6 Drawing Figures

METHOD OF MAKING AN INK ROLLER

CROSS-REFERENCE TO RELATED APPLICATION

This application is a continuation of Ser. No. 282,123, filed July 10, 1981, now abandoned, which is a division of Ser. No. 161,813, filed June 23, 1980, now abandoned, and are assigned to the same assignee as the present application.

FIELD OF THE INVENTION

This invention relates to ink rolls and to method of making same.

BRIEF DESCRIPTION OF THE PRIOR ART

Prior art ink rollers are disclosed in the following U.S. Pat. Nos.: 440,824 to Fuerth granted Nov. 18, 1890; 714,835 to Tevander granted Dec. 2, 1902; 1,018,886 to Dodge granted Feb. 27, 1912; 3,044,397 to Pine granted July 17, 1962; and 3,948,172 to Jenkins granted Apr. 6, 1976.

SUMMARY OF THE INVENTION

This invention relates to a low cost, easy to manufacture ink roller of the fountain type. The purpose of the invention is to provide an ink roller which will deliver ink at a relatively constant rate to a printing member such as a print head in a hand-held labeler. Ink contained in the ink roller is conducted to the porous ink-receptive material. When the ink in the roller is depleted the amount of ink delivered to the printing member diminishes rapidly. Thus, for the useful life of the ink roller the ink roller delivers the right amount of ink to the printing member. There is no gradual degradation over the life of the ink roller as with conventional non-fountain type ink rollers.

In accordance with a specific embodiment, the ink roller includes a tube having a plurality of holes and a porous ink receptive sleeve received about the tube. The holes converge outwardly from the inner surface of the tube to the bottoms of grooves in the outer surface of the tube. The convergence of the holes facilitates flow of ink from inside the tube to the porous sleeve. A bearing roll is connected to each end portion of the tube. It is preferred that one bearing roll is integrally molded with the tube. This enables the sleeve to be slid onto the tube from the end opposite the integral bearing roll and still minimizes the number of parts. The other bearing roll is coupled to the tube. The tube is engaged with a tooth of the other bearing roll and a support prevents the other bearing roll from yielding to obviate disengagement of the other bearing roll from the tube. Also the tube and the other bearing roll are connected at a liquid-tight seal. The open ends of the bearing rolls are sealed off by respective closures. The support and a shaft form portions of the closures, which for the sake of commonality of parts are identical. The closures make liquid-tight seals with the bearing rolls. The bearing rolls provided added ink capacity and also serve as a rolling guide as the ink roller moves relative to the printing member. The tube is readily molded by providing the outer surface with one or more grooves and having the holes open into the bottom or bottoms of the groove or grooves. The core for making the inner surface of the tube makes a liquid-tight seal with ridges on the inner surface of the mold which receives the core. In this way the converging holes are easily made at minimum cost.

DETAILED DESCRIPTION OF THE PREFERRED EMBODIMENT

Figure 1:
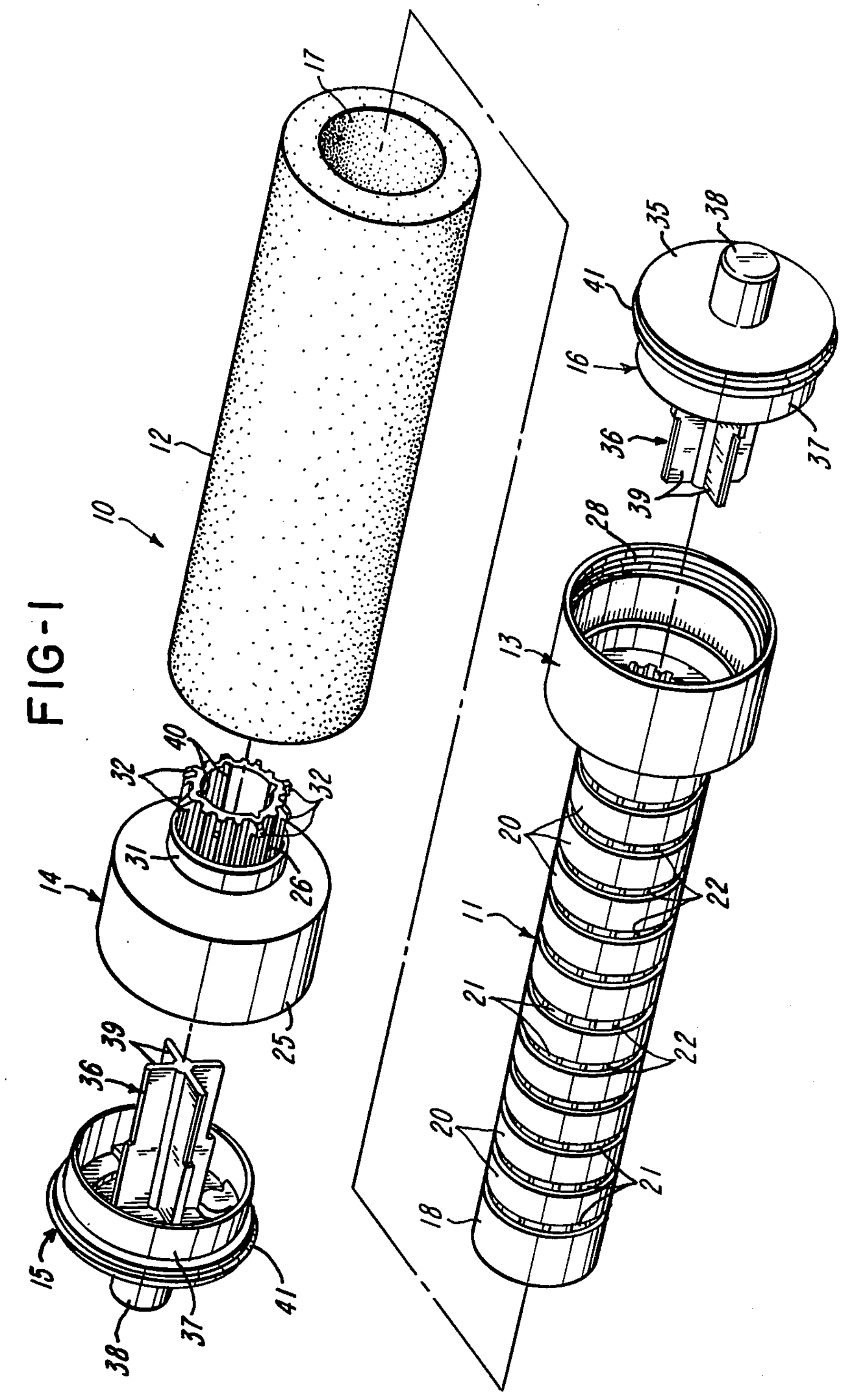
FIG. 1 is an exploded perspective view of an ink roller in accordance with the invention.
Figure 2:
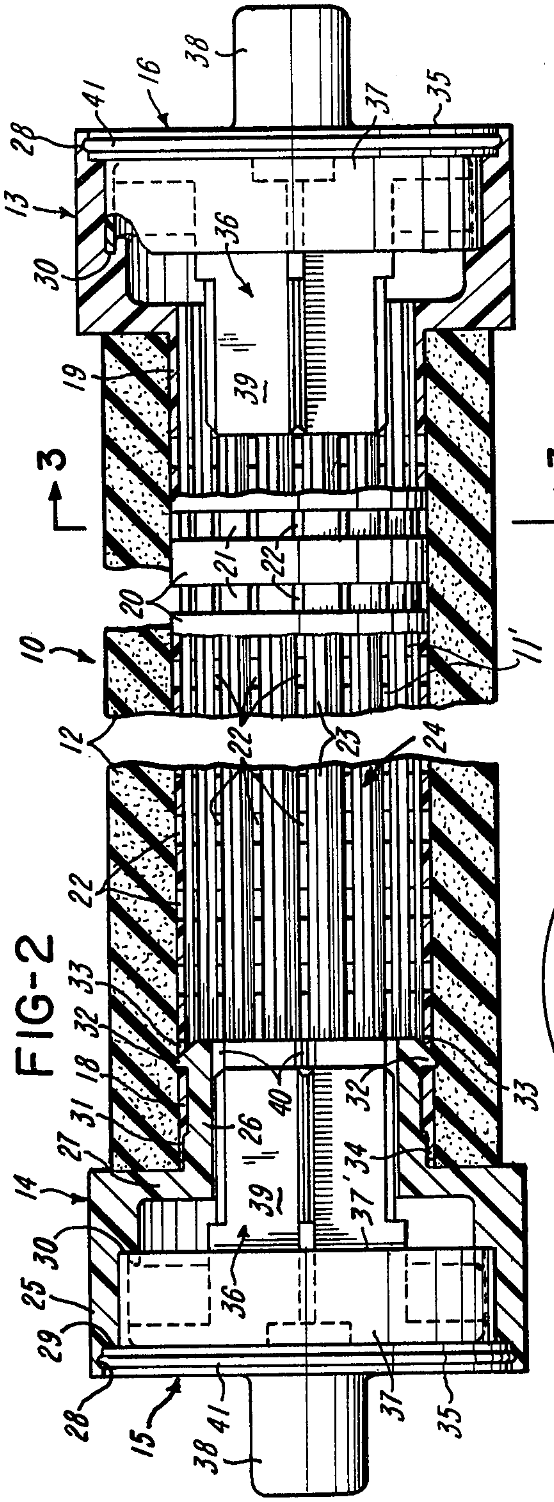
FIG. 2 is an enlarged fragmentary view mainly in section of the ink roller of FIG. 1.
Figure 3:
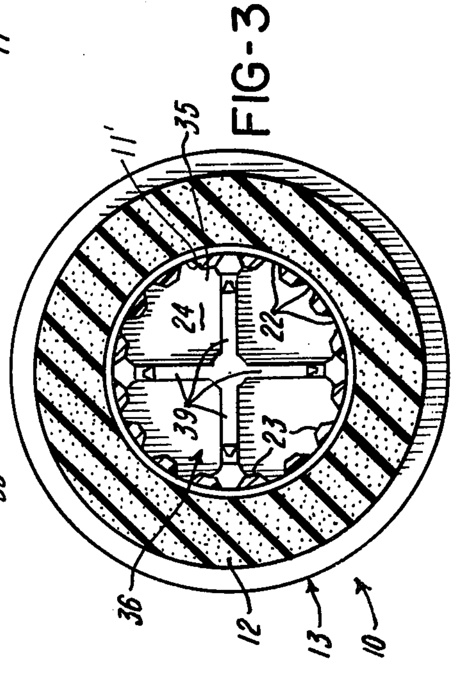
FIG. 3 is a sectional view taken along line 3—3 of FIG. 2.

With reference to FIGS. 1, 2 and 3, there is shown an ink roller generally indicated at 10. The ink roller 10 has a tube generally indicated at 11, porous ink-receptive material in the form of a sleeve 12 received about the tube, a bearing roll 13 formed integrally with the tube 11, a bearing roll 14 coupled to the tube 11, and a pair of identical closures generally indicated at 15 and 16. The sleeve 12 has an elongated through-hole 17 to enable the sleeve 12 to be slid into the tube 11. The tube 11 has end portions 18 and 19 to which the bearing rolls 15 and 16 are connected. The tube 11 also has a series of ridges or rings 20 which are of the same diameter as end portions 18 and 19. The end portions 18 and 19 and the ridges 20 have intervening grooves 21. Holes 22 extend through the tube 11 at the grooves 21. The holes 22 have straight parallel sides in the plane shown in FIG. 2 and straight but converging sides in the plane shown in FIG. 3. Thus, the holes 22 converge from the inside or in interior surface 23 of the tube 11 to the bottoms of grooves 21. The shape of the holes 22 is conducive to the efficient flow of ink (not shown for clarity) from the interior space 24 within the tube 11. It is important that the convergence be from the interior surface 24 outwardly so that essentially all of the last traces of the ink pass to the porous ink-receptive sleeve 12.

The bearing roll 14 is best shown in FIG. 2 to have an annular axially extending wall portion or tubular portion 25, and an annular radially extending wall portion 27 joining the wall portion or tubular portion 26. The wall portion 25 has a continuous internal annular groove 28 adjacent a shoulder 29. The wall portion 25 also has a continuous internal axially extending groove 30.

The outer surface of the wall portion 26 is stepped as indicated at 31. The outer surface of the wall portion 26 also has outwardly extending hook-shaped teeth 32 which engage or couple with holes 33 in the end portion 18. The wall portion 26 is sufficiently resilient to yield slightly as the wall portion 26 is inserted into the end portion 18 of the tube 11. The undersides of the teeth 32 engage or hook the edges of holes 33 as shown in FIG. 2 when assembled. The marginal end 34 of the end portion 18 is thinner than the wall thickness of the tube 11 at the ridges 20. The marginal end 34 makes a snug liquid-tight seal with the stepped or enlarged portion 31 of the wall portion 26. Due to the thinness of the marginal end 34, it accommodates readily to the outer surface of the enlarged portion 31. The marginal end 34 terminates short of the wall portion 27.

The closure 15 has an end wall 35. Extending outwardly in one direction from the end wall 35 is a support generally indicated at 36 and a continuous flange or tubular wall portion 37. Extending outwardly in the opposite direction from the end wall 35 is an annular shaft 38. The support 36 is shown to include a plurality, specifically four, radially extending, thin support members or vanes 39 disposed in close proximity to the inner surface of the wall portion 26 adjacent the teeth 32. The four support members 39 are shown in line with four of the eight teeth 32. The support members 32 prevent the wall 26 from flexing, and thus uncoupling or disengagement of the teeth 32 from the holes 32 is obviated. The four support members 39 are always lined up with four teeth 32 because they fit into four grooves 40.

The terminal end 37' of the wall portion 37 fits into the groove 30 to provide a liquid-tight seal. The wall portion 37 also makes a liquid-tight seal with the inner surface of the wall portion 25. The end wall 35 also includes a continuous annular projection or ridge 41 which makes a snap-fit connection in the groove 28. The ridge 41 acting in groove 28 also makes a liquid-tight seal with the groove 28. The end wall 35 abuts the end face 29.

Although the identical closures 15 and 16 are designated by different general reference characters, the individual portions thereof are designated with the same reference characters. The support 39 of the closure 16 serves no useful purpose because the bearing roll 13 is formed integrally with end portion 19 and hence cannot separate.

Figure 4:
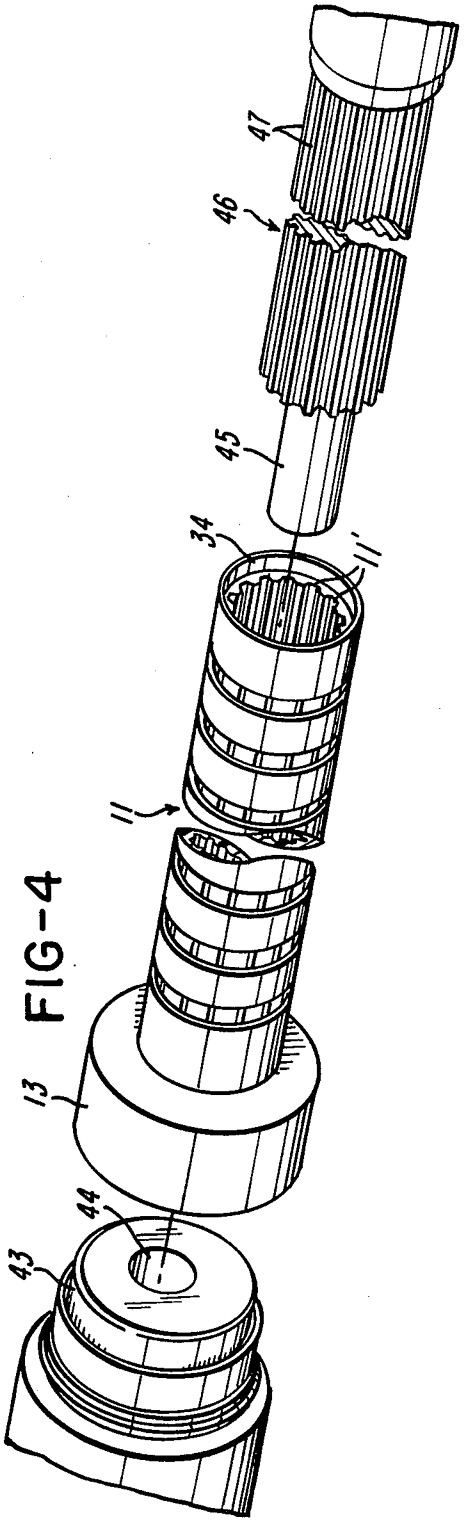
FIG. 4 is an exploded, partly sectional view of a fragment of the ink roller and cores used in molding same.
Figure 6:
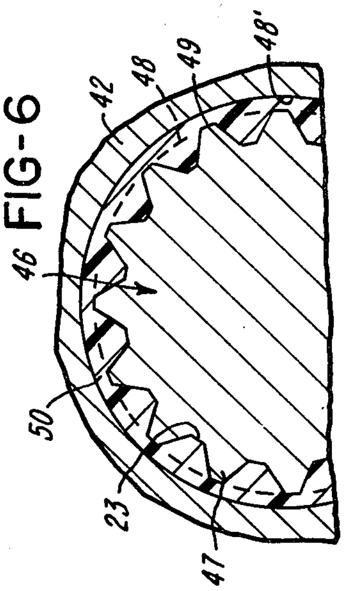
FIG. 6 is a view similar to FIG. 5 but taken through the groove of the mold.
Figure 5:
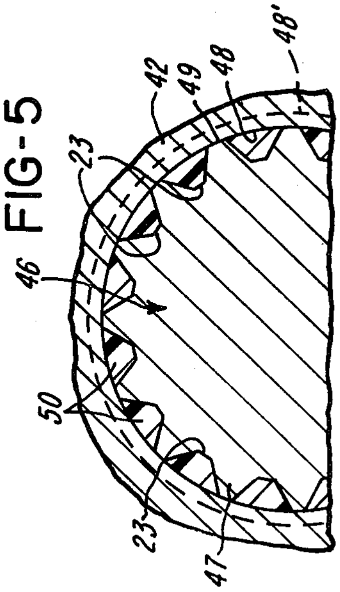
FIG. 5 is a fragmentary sectional view of the mold and core pin taken through the ridge of the mold.

With reference to FIGS. 4, 5 and 6, there is shown a fragment of a mold 42 for making the tube and bearing roll 13. The mold 42 cooperates with a core 43 having a hole 44 for receiving end portion 45 of a core 46. The core 43 makes the inside of the bearing roll 13 and the core 46 makes the inside of the tube 11. The core 46 has external flutes 47 which are shown to be straight and tapered. The inside of the mold 42 has a plurality of spaced ridges providing an annular surface 48. The ridges provide intervening grooves that provide a surface 48'. The outer surfaces 49 of the flutes 47 have the same radius as the surface 48. The outer surfaces 49 make a liquid-tight seal with the inner surface 48 so that during molding the moldable plastics material 50 does not flow there. Thus the places where the outer surfaces 49 of the core 46 contact the inner surface 48 of the mold 42 form outlets of the holes 22 into grooves 21. The sides of the flutes converge as shown so that the sides of the resultant holes 22 converge as shown, for example, in FIG. 3. Following molding the cores 43 and 46 are moved relatively apart and the tube 11 and its bearing roll 13 are removed. The flutes 47 make straight axially extending grooves on the inside of the tube 11 as indicated at 11'. The grooves communicate with the holes 22. The material 50 of which the tube 11 and its bearing roll 13 are composed is moldable plastics material. The bearing roll 14 and the closures 15 and 16 are also molded of plastics material. This material is sufficiently flexible and resilient to enable the component parts to snap together.

If desired the grooves 21 can be a continuous helical groove. In that event the ridges 48 are required to be helical.

While it is preferred to mold the bearing roll 13 integrally with the tube 11 as shown at the right side of FIG. 2, the end portion 19 of the tube 11 can be made identical to the end portion 18 and the bearing roll 13 can be made identical to the bearing roll 14. In this construction, the support 36 of the closure 16 would serve the same function as the support 36 of the closure 15.

Other embodiments and modifications of this invention will suggest themselves to those skilled in the art, and all such of these as come within the spirit of this invention are included within its scope as best defined by the appended claims.

I claim:

1. Method of making an ink roller, comprising the steps of: providing an annular mold cavity having a longitudinal axis and lateral ridge means and intervening lateral groove means on its inner periphery, providing a core having a plurality of longitudinally extending flutes, the outside diameter of the core at the flutes being the same as the inside diameter of the mold cavity at the ridge means, inserting the core into the mold cavity to provide a liquid-tight seal against flow of moldable plastics material where the ridge means and the flutes intersect, filling the space between the mold and the core with moldable plastics material to form a tube having spaced openings at the intersections of the ridge means and flutes, removing the tube from the mold cavity and the core, placing a tubular porous ink-receptive sleeve over the tube, introducing ink into the interior space within the tube, and closing off an end portion of the tube.

2. Method as defined in claim 1, wherein the flutes are straight, the step of removing the tube from the mold cavity and the core includes moving the core and the molded tube apart along a straight line.

3. Method of making an ink roller, comprising the steps: providing an annular mold cavity having a longitudinal axis and lateral ridge means and intervening lateral groove means on its inner periphery, providing a core having a plurality of longitudinally extending flutes, the outside diameter of the core at the flutes being the same as the inside diameter of the mold cavity at the ridge means, inserting the core into the mold cavity to provide a liquid-tight seal against flow of moldable plastics material where the ridge means and the flutes intersect, filling the space between the mold and the core with moldable plastics material to form a tube having spaced openings at the intersections of the ridge means and flutes, removing the tube from the mold cavity and the core, placing a tubular porous ink-receptive sleeve over the tube, closing off one end portion of the tube, thereafter introducing ink into the interior of the tube, and thereafter closing off the other end portion of the tube.

4. Method as defined in claim 3, including the step of rotatably mounting the ink roller in a printer.

* * * * *